Nov. 12, 1957  E. A. LAURING  2,813,046
FLAME RESISTANT FIBERBOARD
Filed Aug. 1, 1955
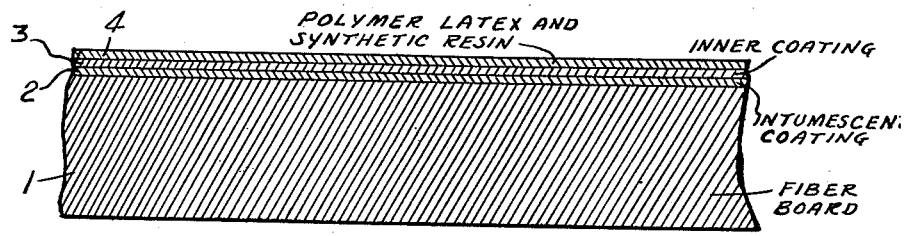
INVENTOR.
EDGAR A. LAURING
BY
H. F. Woodward
atty

United States Patent Office 2,813,046
Patented Nov. 12, 1957

2,813,046

FLAME RESISTANT FIBERBOARD

Edgar A. Lauring, International Falls, Minn.

Application August 1, 1955, Serial No. 525,820

3 Claims. (Cl. 117—72)

This invention relates in general to fire retarding coatings for fibrous materials including particularly composition wall board such as fiber insulation board and the like or other surfacing materials.

More specifically, the invention relates to fire retarding coatings which are intumescent and which thus have additional fire retarding properties resulting from such intumescence.

The use of fire retarding coatings which are intumescent to some extent is not entirely new. The principal defects heretofore in such coatings have been that the resulting coatings are not washable and are easily marred. The usual formulation of such fire retarding coatings includes a carbohydrate in combination with a soluble salt of some known fire retarding property. The carbohydrate acts as an inhibitor for the crystallization of the salts and holds it firmly in the treating material. The fire retardant of this type is not washable and is easily marred and, therefore, cannot be cleaned in the normal manner.

While it is known that the reinforcing of the carbohydrate by the use of synthetic resins such as urea formaldehyde or melamine formaldehyde will give fire retardant coatings with a greater degree of permanency, nevertheless, this does not render the coating washable or sufficiently mar resistant.

An object of the present invention is to provide an improved fire retarding coating which will be washable.

A related object is to produce an intumescent coating which will be relatively scuff resistant.

Other and further objects of the invention are to produce an improved flame retarding coating which can be made weather proof and washable without loss of the flame resistance.

For the purpose of this application there has been elected to set forth certain coatings and methods of producing the same, but it is to be understood that they are here presented for illustrative purposes only and are not to be accorded any interpretation such as might have the effect of limiting what is claimed as the invention short of its true and comprehensive scope in the art.

In the drawing is shown a fragmentary sectional view of the combustible material coated with a washable flame resistant coating. 1 represents a fiberboard having thereon an intumescent coating 2, an inner coating 3 containing a small amount of polymer latex and an outer coating 4 containing polymer latex and a synthetic resin.

In accordance with the invention fire resistant and flame retarding properties are imparted to the vegetable fiber board or other combustible materials by applying to the same a layer or layers of chemicals which are stable and potentially active and which, when subjected to heat, puff up or form a foam which excludes the air and provides an insulation barrier between the heat. Thus, the combustible material is protected from damage by destructive distillation or by combustion to a sufficient degree to retard ignition and prevent the spread of flame.

In carrying out the invention there is provided an improved fire retarding coating which may be intumescent and which achieves the above objects in that such coatings are washable, scuff resistant and weather proof. The chief distinction between this intumescent fire retarding coating and previous fire retarding coatings lies in the fact that the highly soluble fire retardant salt heretofore considered necessary may be used at the same time providing washable and cleanable surfaces.

It has heretofore been known that fire retarding coatings which are intumescent, if covered with a film to provide a washable surface, were reduced if did not destroy the flame resistance of such coating. In accordance with this invention a washable coating is provided without substantial reduction in flame resistance.

Intumescent coating compositions have been applied to combustible materials for protection against fire, some of which are disclosed in United States Patents Nos. 2,452,054, 2,536,626 and 2,594,937. Fire coatings have exhibited satisfactory fire retardant properties but poor abrasion resistance properties. Intumescent coatings deposited by available commercial compositions are removed when the coatings are washed as they have virtually no resistance to scrubbing. When coatings such as these are employed as fire retardants in cellulosic wall members and attempts are made to keep such members clean by washing and scrubbing operations, it is found that the life span of the coating is short. Also such coatings have little flexibility and are subject to cracking. A composition that deposited a coating exhibiting good fire retardance and abrasion characteristics is much to be desired.

It has been found that by applying a flame resistant coating to the fiber wall board and thereafter applying an additional coating over the first which contains a polymer latex in combination with urea formaldehyde resin in a definite relationship to the latex, that a washable flame resistant coating product is produced. It is preferred that the polymer latex of about 50% solids be used in the composition in about 8 to about 12 parts to about 4 to about 6 parts of the urea formaldehyde resin. Any polymer latex dispersion capable of forming a film is satisfactory for the purpose. Examples of such latices are Dow Latex 762K or a polymeric material such as the polymers of vinyl acetate, copolymers of styrene butadiene, copolymers of vinylidene chloride and acrylonitrile. It is to be understood that each of the polymers or copolymers should be supplied in latex which is capable of forming a film.

The fiber board or acoustical tile has applied by suitable means an intumescent flame resistant coating of which the following is an example:

| | | |
|---|---|---|
| Water | pounds | 60 |
| Calender starch | do | 2.3 |
| Urea | do | 9 |
| UF Concentrate 85 | do | 25 |
| Water | do | 82 |
| TiO$_2$ | do | 25 |
| Asbestine | do | 60 |
| Mono ammonium phosphate | do | 100 |
| Water | do | 10 |
| Latex 762K | do | 2 |
| CPH (wetting agent) | grams | 80 |

Generally, it is preferred that a second coat be applied of which the following is an example:

| | | |
|---|---|---|
| Water | pounds | 13 |
| Calender starch | do | 2.3 |
| Urea | do | 9 |
| UF Concentrate 85 | do | 25 |
| Water | do | 106.3 |
| TiO$_2$ | do | 20 |
| Asbestine | do | 100 |

| | | |
|---|---|---|
| Water | do | 10 |
| Latex 762K | do | 2 |
| CPH—30 (wetting agent) | grams | 80 | and thereafter the finished coating is applied which may be as follows:

| | Pounds |
|---|---|
| Water | 7.53 |
| Urea | 1.54 |
| UF Concentrate 85 | 4.26 |
| Latex 762K | 10.32 |
| Water | 1.50 |
| TiO$_2$ | 1.67 |

It is to be understood that the top coat must be compatible with the undercoat to obtain the results desired.

It is also to be understood that in place of CPH any suitable wetting agent may be used. UF Concentrate 85 has about the following properties:

| | |
|---|---|
| Formaldehyde, percent | 59.2 |
| Urea, percent | 25.7 |
| Total solids | 84.9 |
| Mol ratio | 4.61 |
| pH | 8.5 |

The coating applied according to this invention when tested in accordance with Commercial Standards 42–49, after being washed exhibited no smoldering and a char area of less than about 8 square inches.

It will be understood that the details given here are for the purpose of illustration, not restriction, and that variations within the spirit of the invention are intended to be included in the scope of the claims.

Economically, it is advantageous to use as much urea formaldehyde resin as possible in the final coating but an amount of this material cannot be used which results in brittleness. To obtain a flexible and washable coating that has good flame resistance, about 50% latex must be used in the top or final coating. If more than about 50% of latex is used, the flame resistance decreases rapidly. From the standpoint of economics, washability and flexibility, about 50% of urea formaldehyde resin and about 50% polymer latex gives the best coating. It is preferred that the polymer latex be included in the first and second coat and in an amount not to exceed about 20 to about 25% of the polymer latex contained in the final coat.

What is claimed:

1. A combustible building material coated with an intumescent coating which includes carbohydrate and a film forming polymer latex in approximately the same amounts, said polymer latex in the intumescent coating not exceeding 20 to 25% of the polymer latex contained in an outer coating, an outer coating of polymer latex and urea formaldehyde resin, the said polymer latex and urea formaldehyde resin being present in substantially equal amounts in the outer coating.

2. A combustible building material coated with an intumescent coating containing carbohydrate, urea, monoammonium phosphate and a polymer latex, the said carbohydrate and latex being present in about equal amounts, a second coating superimposed upon the first coating and containing a carbohydrate, urea resin and a polymer latex in an amount substantially equal to that contained in the first coating and a third coating superimposed upon the second coating containing urea formaldehyde resin and latex in substantially equal amounts, said latex in the third coating being about four to about five times the amount contained in the second coating.

3. A flame resistant structural panel comprising a fiberboard having at least one major surface coated with a series of coatings, one coating directly in contact with said fiberboard having intumescent properties and containing a polymer latex in an amount not to exceed about 25% of the polymer latex contained in the final coating and a carbohydrate, and a final coating containing substantially equal parts of pigmented film forming polymer latex and urea formaldehyde resin.

References Cited in the file of this patent

UNITED STATES PATENTS

| 1,862,504 | Calvert | June 7, 1932 |
| 2,028,716 | Delaney | Jan. 21, 1935 |
| 2,684,953 | Stilbert et al. | July 27, 1954 |

FOREIGN PATENTS

| 551,309 | Great Britain | Feb. 17, 1943 |